(12) United States Patent
Tsuyuki

(10) Patent No.: US 9,091,223 B2
(45) Date of Patent: Jul. 28, 2015

(54) EXHAUST GAS RECIRCULATION SYSTEM FOR AN INTERNAL COMBUSTION ENGINE

(75) Inventor: Takeshi Tsuyuki, Hadano (JP)

(73) Assignee: Nissan Motor Co., Ltd., Kanagawa (JP)

( * ) Notice: Subject to any disclaimer, the term of this patent is extended or adjusted under 35 U.S.C. 154(b) by 560 days.

(21) Appl. No.: 13/472,952

(22) Filed: May 16, 2012

(65) Prior Publication Data

US 2012/0304640 A1 Dec. 6, 2012

(30) Foreign Application Priority Data

Jun. 6, 2011 (JP) .................................. 2011-125935

(51) Int. Cl.
*F02B 33/44* (2006.01)
*F02M 25/07* (2006.01)
(Continued)

(52) U.S. Cl.
CPC ............ *F02D 41/0065* (2013.01); *F02D 21/08* (2013.01); *F02D 41/0077* (2013.01); *F02D 41/145* (2013.01); *F02D 41/18* (2013.01); *F02D 2041/1431* (2013.01); *F02D 2200/0408* (2013.01); *F02M 25/0707* (2013.01); *F02M 25/0709* (2013.01); *F02M 25/0727* (2013.01);
(Continued)

(58) Field of Classification Search
CPC . F02D 21/08; F02D 41/0065; F02D 41/0077; F02D 41/145; F02D 2041/1431; F02D 2200/0408; F02D 41/18; F02M 25/0709; F02M 25/0707; F02M 25/0727; F02M 25/0738; F02M 25/0754; F02B 37/16; F02B 37/18; Y02T 10/144; Y02T 10/47
USPC .......... 60/605.2, 605.1; 123/568.12; 701/108, 701/101–102, 104–105
See application file for complete search history.

(56) References Cited

U.S. PATENT DOCUMENTS 5,974,870 A 11/1999 Treinies et al.
6,012,431 A * 1/2000 Itoyama et al. ................ 701/104
(Continued)

FOREIGN PATENT DOCUMENTS

CN 1214104 A 4/1999
EP 2495419 A1 * 9/2012 .............. F02D 23/00
(Continued)

OTHER PUBLICATIONS

Office Action issued in corresponding Chinese Application No. 201210173180.4, mailed Mar. 11, 2014 (8 pages).
(Continued)

*Primary Examiner* — Thai Ba Trieu
(74) *Attorney, Agent, or Firm* — Osha Liang LLP

(57) ABSTRACT

An exhaust gas recirculation device for an internal combustion engine having a supercharger has an intake air passage that intakes intake air for the internal combustion engine, an exhaust passage that carries away exhaust air from the internal combustion engine, an exhaust gas recirculation passage connected to the intake air passage, and an exhaust gas recirculation valve interposed within the exhaust gas recirculation passage. The exhaust gas recirculation passage recirculates a part of the exhaust gas based on an openness of the exhaust gas recirculation valve to control an amount of exhaust recirculation introduced into the intake air passage. A first end of the exhaust gas recirculation passage is connected to the intake air passage upstream of a compressor of the supercharger. A second end of the exhaust gas recirculation passage is connected to the exhaust passage downstream of a turbine of the supercharger.

17 Claims, 6 Drawing Sheets

(51) Int. Cl.
*G06F 19/00* (2011.01)
*F02D 41/00* (2006.01)
*F02D 21/08* (2006.01)
*F02D 41/14* (2006.01)
*F02D 41/18* (2006.01)

(52) U.S. Cl.
CPC ........ *F02M 25/0738* (2013.01); *F02M 25/0754* (2013.01); *Y02T 10/47* (2013.01)

(56) References Cited

U.S. PATENT DOCUMENTS

| | | | |
|---|---|---|---|
| 6,167,342 A * | 12/2000 | Itoyama et al. | 701/104 |
| 6,298,299 B1 * | 10/2001 | Itoyama et al. | 701/101 |
| 6,868,329 B2 | 3/2005 | Ito et al. | |
| 8,116,967 B2 * | 2/2012 | Bottcher et al. | 701/115 |
| 8,447,500 B2 * | 5/2013 | Suzuki et al. | 701/105 |
| 2005/0178123 A1 | 8/2005 | Uchiyama et al. | |
| 2007/0174003 A1 * | 7/2007 | Ueno et al. | 701/105 |
| 2009/0112444 A1 * | 4/2009 | Ishizuka et al. | 701/105 |
| 2009/0192693 A1 * | 7/2009 | Bottcher et al. | 701/102 |
| 2009/0192699 A1 * | 7/2009 | Bottcher et al. | 701/108 |
| 2011/0231081 A1 * | 9/2011 | Suzuki et al. | 701/104 |
| 2012/0137675 A1 * | 6/2012 | Ito | 60/602 |
| 2013/0269662 A1 * | 10/2013 | Kuhn et al. | 123/568.11 |
| 2013/0305714 A1 * | 11/2013 | Rollinger et al. | 60/603 |
| 2013/0305715 A1 * | 11/2013 | Rollinger et al. | 60/605.2 |
| 2014/0007647 A1 * | 1/2014 | Mannal et al. | 73/1.59 |
| 2014/0150761 A1 * | 6/2014 | Blumendeller et al. | 123/676 |

FOREIGN PATENT DOCUMENTS

| | | |
|---|---|---|
| JP | H10-26049 A | 1/1998 |
| JP | H11-62720 A | 3/1999 |
| JP | 2000-170588 A | 6/2000 |
| JP | 2000-356158 A | 12/2000 |
| JP | 2004-150343 A | 5/2004 |
| JP | 2009-185732 A | 8/2009 |
| JP | 2010-059916 A | 3/2010 |
| JP | 2010-116894 A | 5/2010 |
| JP | 2010-242617 A | 10/2010 |
| WO | 2011/052066 A1 | 5/2011 |

OTHER PUBLICATIONS

Notification of Reasons for Refusal issued in corresponding Japanese Application No. 2011-125935, mailed on Feb. 24, 2015 (8 pages).

* cited by examiner

EXHAUST GAS RECIRCULATION SYSTEM FOR AN INTERNAL COMBUSTION ENGINE

BACKGROUND OF THE DISCLOSURE

1. Field of the Disclosure

This disclosure generally relates to an exhaust gas recirculation (EGR) system for an internal combustion engine.

2. Description of the Related Art

In Patent Document 1 is disclosed a cooling system of EGR for an internal combustion engine in which an EGR control during a quick acceleration may be effectively performed. Specifically, an estimate or virtual EGR rate is calculated based on a pressure difference across an EGR valve. In addition, a target EGR rate is calculated from engine rotational speed. A difference between the virtual EGR rate and the target EGR rate is used to correct an EGR valve opening.

[Patent Document 1] Japanese Unexamined Publication of Application 2004-150343, which has a corresponding U.S. Pat. No. 6,868,329 to Ito et al.

SUMMARY OF THE CLAIMED SUBJECT MATTER

An internal combustion engine having a supercharger, comprises an intake air passage delivering intake air into the internal combustion engine, an exhaust passage discharging exhaust gas from the internal combustion engine, an exhaust gas recirculation passage connected to the exhaust passage and the intake air passage, and an exhaust gas recirculation valve interposed within the exhaust gas recirculation passage to control an amount of exhaust recirculation introduced into the intake air passage. A first end of the exhaust gas recirculation passage is connected to the intake air passage upstream of a compressor of the supercharger. A second end of the exhaust gas recirculation passage is connected to the exhaust passage downstream of a turbine of the supercharger, and an exhaust gas recirculation control device. The exhaust gas control device further comprises an intake air sensor detecting an amount of the intake air upstream of the compressor, an intake air pressure estimate unit estimating an intake air pressure at the first end of the exhaust recirculation passage with respect of the amount of the intake air upstream of the compressor being detected, a first exhaust gas pressure estimating unit estimating a first estimate of exhaust gas pressure at the second end of exhaust gas recirculation passage with respect to the amount of the intake air upstream of the compressor being detected, and a second exhaust gas pressure estimating unit estimating a second estimate of exhaust gas pressure in combination with a predetermined response-delay processing on the first estimate of exhaust gas pressure. The opening of the exhaust gas recirculation valve is adjusted based on a pressure difference between the intake air pressure estimated by the intake air pressure estimate unit and the second estimate of the exhaust gas pressure.

An internal combustion engine comprises an intake passage supplying intake air to the engine, an exhaust passage discharging exhaust gas out of the engine, an exhaust gas recirculation gas passage connected to the intake passage and the exhaust passage, an exhaust gas recirculation control valve adjusting exhaust gas recirculation amount, and an airflow meter detecting an air flow upstream of the position where the exhaust gas recirculation passage is injected into the intake passage, and an exhaust gas recirculation control unit configured to estimate an intake air pressure in response to the air flow being detected, estimate a first estimate of exhaust gas pressure based on the air flow being detected at a position in which the exhaust gas recirculation passage is connected for extracting exhaust gas, estimate a second estimate of exhaust gas pressure in combination with a response-delay due to a change in the air flow on the first estimate of exhaust gas pressure, and adjust an opening of the exhaust gas recirculation control valve based on the intake air pressure being estimated and the second estimate of exhaust gas pressure.

DETAILED DESCRIPTION

Embodiments of the present disclosure are described in detail below with reference to accompanying drawings. In embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid obscuring the disclosure.

In the technique disclosed in the Patent Document 1, a pressure sensor is required to be disposed to detect a pressure difference across a EGR valve, which adds an additional cost to the system.

The EGR system according to one or more embodiments of the present disclosure has an arrangement in which an EGR valve opening will be corrected and used during a transitional or transient operation depending on both an estimate of intake air pressure and an estimate of exhaust gas pressure (second estimate of exhaust gas pressure). The estimate of exhaust gas pressure has been calculated by applying a predetermined delay processing on an estimate of exhaust gas (first estimate of exhaust gas pressure) obtained based on an amount of intake air. According to one or more embodiments of the present disclosure, the transient operation may include an vehicle acceleration or deceleration where a substantial change in intake air amount takes place.

According to one or more embodiments of the present disclosure, by adjusting or correcting an opening of the EGR valve in accordance with an estimate of intake air pressure in a position in which an EGR passage is connected to an intake passage (EGR injection point) for injecting EGR gas and the second estimate of exhaust gas pressure reflecting a response delay in a position in which the EGR passage is connected to an exhaust passage (EGR extract point) for extracting or removing exhaust gas, an EGR valve opening will be controlled to maintain a substantially constant EGR rate without relying on a pressure sensor that would otherwise be necessary to measure a pressure difference across the EGR valve.

Figure 1:
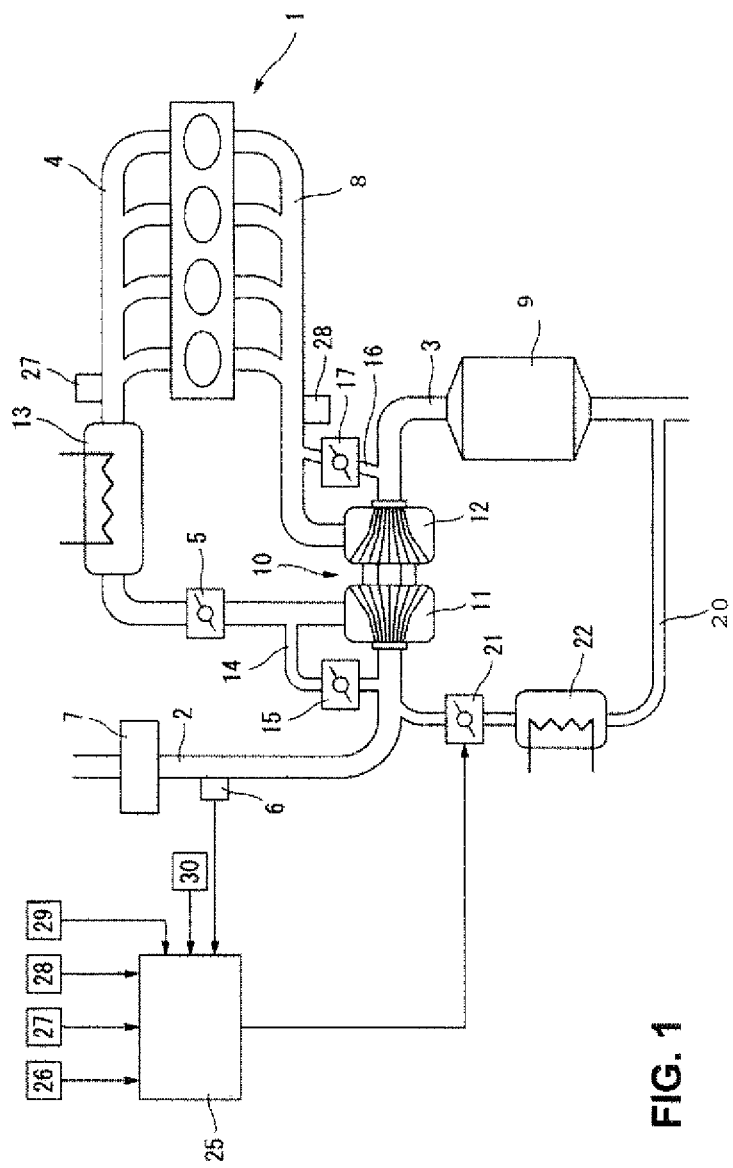
FIG. 1 shows a diagram schematically of an overall configuration of the EGR system for an internal combustion engine according to one or more embodiments of the present disclosure.

FIG. 1 shows an overall configuration of the exhaust gas recirculation (EGR) system for an internal combustion engine according to one or more embodiments of the present disclosure. An intake passage 2 and an exhaust passage 3 are connected to an internal combustion engine 1, respectively. Within the intake passage 2 connected to the engine 1 via an intake manifold 4 is disposed a throttle valve 5, and upstream thereof is disposed an air flow meter 6 to detect an intake air amount and an air cleaner 7. Airflow meter 6 houses a temperature sensor inside and is thus capable of detecting an intake air temperature. Within exhaust gas passage 3, which is connected to the engine 1 through an exhaust manifold 8, a catalyst such as a three-way catalyst is provided for exhaust gas purification.

Moreover, internal combustion engine 1 has a turbocharger 10 with a compressor 11 disposed in intake air passage 2 and a turbine 12 coaxial with compressor 11 and disposed in exhaust gas passage 3. Compressor 11 is disposed upstream of throttle valve 5 and downstream of airflow meter 6. Turbine 12 is disposed upstream of exhaust catalyst 9. An intercooler 13 is provided downstream of throttle valve 5.

An intake air by-pass conduit 14 is connected to intake passage 2 to bifurcate therefrom, bypassing the compressor 11 and merging into intake passage 2 again. In the air by-pass conduit 14 is provided an intake air by-pass valve 15 to control an amount of by-pass air passing through air by-pass conduit 14.

An exhaust gas by-pass conduit 16 is connected to exhaust passage 3 to bifurcate therefrom, bypassing the turbine 12 and merging into exhaust passage 3 again. In the exhaust gas by-pass conduit 16 is interposed an exhaust gas by-pass valve or so-called wastegate valve 17 for controlling an exhaust gas flow within exhaust by-pass conduit 16.

In addition, the internal combustion engine 1 is configured to perform an exhaust gas recirculation (EGR) operation, and an exhaust recirculation passage (EGR passage) 20 is provided between exhaust passage 3 and intake passage 2. EGR passage 20 has one end thereof connected to exhaust gas passage 3 downstream of exhaust catalyst 9, and another end connected to intake air passage 2 at a point downstream of air cleaner 7 and upstream of compressor 11. Thus, by making use of a pressure difference between an intake air pressure and exhaust gas pressure, a part of exhaust may be recalculated and introduced into intake air passage 2 even during a supercharged operation. In the EGR passage 20 are interposed both a EGR control valve 21 and EGR cooler 22, respectively. The opening degree or openness of EGR control valve 21 is subject to a control of a control unit 25 and a desired EGR rate will be achieved depending on operative conditions of the engine. For example, at low speed, low load condition, EGR rate will be maximized, whereas, as the load and the engine speed increase, EGR rate will be controlled to decrease accordingly.

Control unit 25 receives, in addition to a detected signal of airflow meter 6, a signal from a crank angle sensor 26 to detect a crank angle of crankshaft (not shown), a signal from intake air temperature sensor 27 to detect an intake air temperature within intake manifold 4, a signal from an exhaust gas temperature sensor 28 to detect an exhaust gas temperature at an upstream side of turbine 12, a signal from an accelerator pedal opening sensor 29 to detect an depressed stroke of accelerator pedal (not shown), a signal from an atmosphere pressure sensor 30 to detect an atmospheric pressure, and the like.

Thus, in response to receipt of these signals, control unit 25 performs a control of ignition timing and air/fuel ratio of internal combustion engine 1 together with a control of exhaust gas recirculation (EGR) by adjusting opening degree of EGR control valve 21, and thereby extracting part of exhaust gas from exhaust passage 3 and recirculating into intake passage 2. The openings of throttle valve 5, intake bypass valve 15, and wastegate valve 17 are likely under control of control unit 25.

Figure 2:
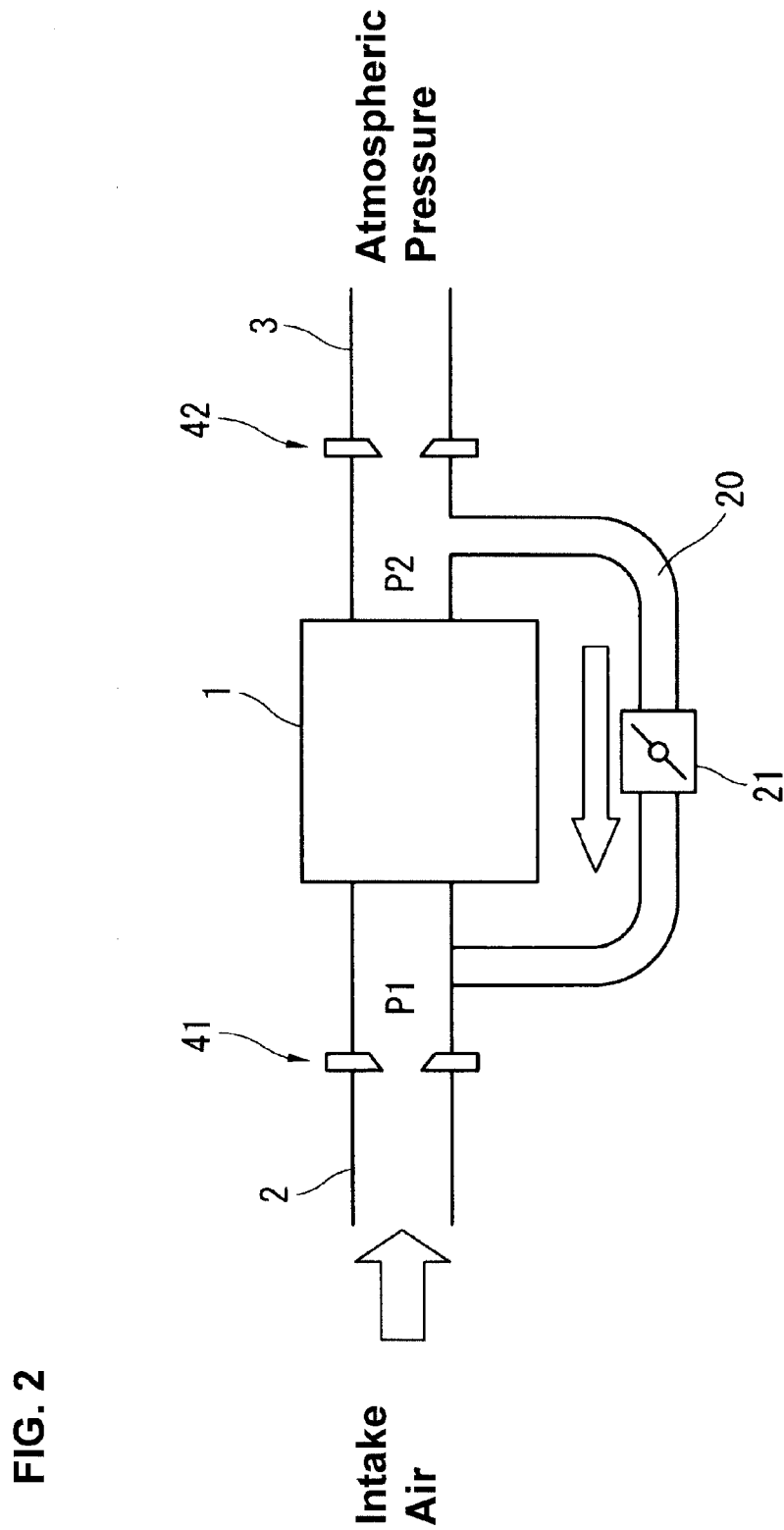
FIG. 2 shows a schematic diagram explaining an intake air pressure as well as exhaust gas pressure.

FIG. 2 shows a schematic diagram explaining an intake air pressure and exhaust gas pressure of internal combustion engine 1 according to one or more embodiments of the present disclosure. A pressure loss which is attributable to intake system including air cleaner 7 in intake passage 2 may be represented by that caused by a pseudo orifice 41 for purpose of simplicity. As an intake air amount or flow increases, the pressure difference across the pseudo orifice 41 also increases. The pseudo orifice 41 is associated with mechanical parts of intake air system and, thus, the diameter of the pseudo orifice may not be considered to subject to change. Thus, assuming that the intake system components upstream of EGR introduction point may be represented by the pseudo orifice 41, the intake air pressure P1 at the EGR introduction or injection point may be calculated based on an amount of air passing through this pseudo orifice 41, and the value representing the difference pressure or a gauge pressure may increase (i.e., with a larger vacuum pressure) as the amount of intake air passing through the pseudo orifice 41 increases.

Similarly, a pressure difference due to exhaust system components such as a muffler (not shown) and a under-floor catalyst (not shown) may be regarded as another pseudo orifice 42. As in the case of above, the pressure difference across the pseudo orifice 42 increases as the exhaust gas amount increases. Note that the pseudo orifice 42 is associated with mechanical parts of exhaust gas system, and thus the diameter of the pseudo orifice 42 may not be considered to be changeable. Thus, assuming that the exhaust system components downstream of EGR extraction point may be represented by the pseudo orifice 42, the exhaust gas pressure P2 at this EGR extract point may be calculated based on an amount of gas passing through this pseudo orifice 42 and the value representing the difference pressure or a gauge pressure may increase as the amount of exhaust gas passing through the pseudo orifice 42 increases. The exhaust gas pressure P2 also increases as the intake air flow increases.

Figure 3:
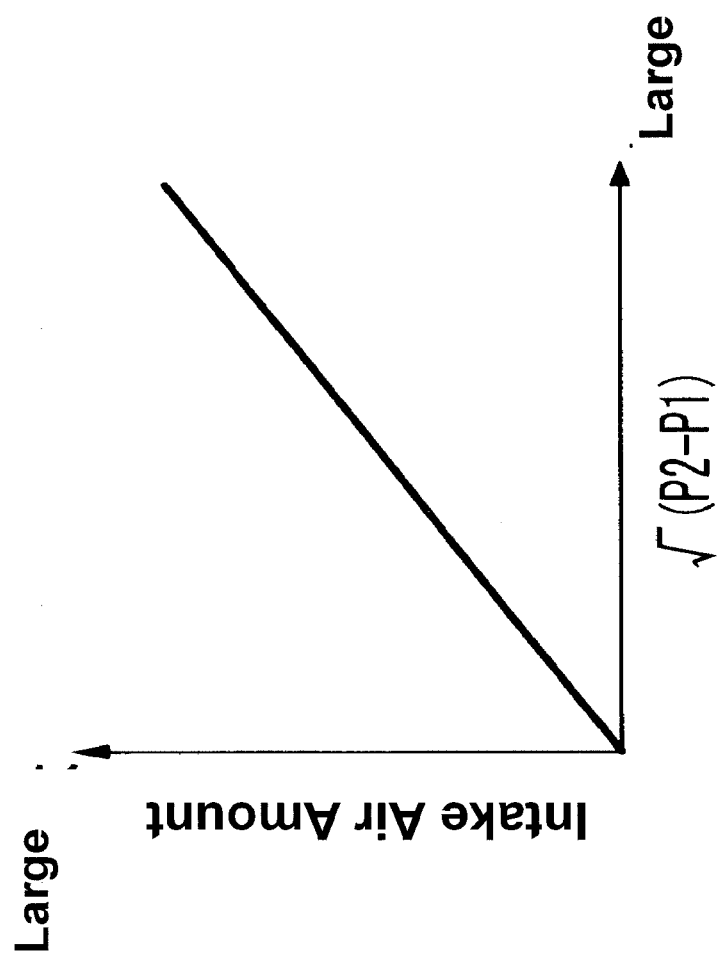
FIG. 3 shows a graph of an interrelationship between an amount of intake air and a pressure difference between intake air pressure (P1) and exhaust gas pressure (P2).

Here, based on Bernoulli's Principle, the relationship between intake air amount and the square root of the difference between exhaust gas pressure P2 and intake air pressure P1 may be represented in FIG. 3 to show a proportional relationship therebetween. Therefore, it may be concluded that a proportional relationship is also present between intake air amount and EGR amount (i.e. EGR rate is constant). In other words, when opening of EGR valve is maintained constant, even intake air amount may change, EGR rate would not vary because of the rate of EGR amount to intake air amount is constant. It has been contemplated by the present inventor that, when an EGR gas would be injected at a point downstream of throttle valve 5, the above relationship could not be established because the pressure at EGR injection position would be significantly influenced by an opening degree of throttle valve 5 so that, even at the same intake air amount, i.e, at stable operation, an opening degree of EGR control valve 21 has to be adjusted, which might cause the entire control strategy to be more complicated. In addition, although one or more of the present embodiments includes a turbocharger, oen or more embodiments of the present disclosure may also be applicable in a system in which such a supercharger is not utilized as long as the pressure at the EGR injection position is less than that at the EGR extract position so that an effective pressure difference for recirculation of exhaust may be generated.

Figure 4:
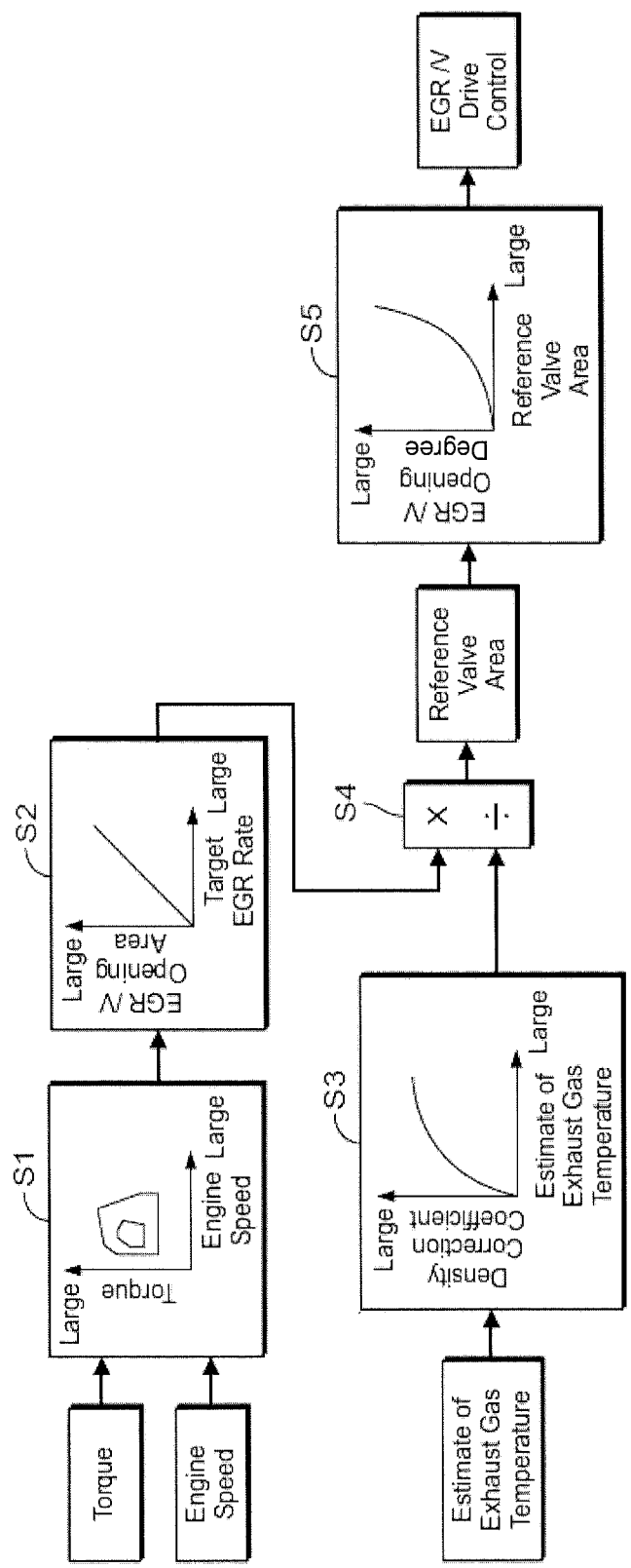
FIG. 4 shows a block diagram of calculation contents of EGR valve opening in a stable condition.

FIG. 4 is a block diagram showing the contents of calculations or an arithmetic operation to obtain a valve opening of EGR control valve 21.

In S1, a target EGR rate is calculated based on a torque and engine rotation speed by referring to a target EGR rate calculation map. The torque may be calculated based on a detected value of accelerator opening sensor 29, and engine rotation speed may be obtained by a detection value of crank angle sensor 26. EGR rate calculation map may be configured by allocating target EGR rates depending on respective operation areas or regions of internal combustion engine 1.

In S2, a target EGR rate is transformed into a target opening of EGR control valve 21. In the one or more embodiments of the present disclosure, when a part of exhaust gas is recalculated from a downstream side of exhaust catalyst back to upstream side of compressor 11, and EGR rate may be determinable unambiguously or directly by defining an opening degree of EGR control valve, irrespective an amount of air flow.

In S3, an estimate of exhaust gas density correction map is consulted based on an estimate of exhaust gas temperature and an exhaust gas correction coefficient will be obtained. The exhaust gas estimate is made based on an engine rotation speed detected by crank angle sensor 26 and obtainable by using a map of intake air amounts prepared with respective engine rotation speed ranges.

In S4, a reference valve opening is calculated by dividing an opening area of EGR control calculated in S2 by exhaust gas density correction coefficient obtained in S3.

In S5, the reference valve opening area will be transformed into a valve opening degree of EGR control valve 21 and an actual valve opening degree of EGR control valve 21 will be adjusted or corrected accordingly. As the reference valve area increases, the opening degree of EGR control valve 21 also increases.

During a period of transient operation, the above mentioned reference valve opening will be subjected to a transient correction (depending on valve opening area correction value) to obtain a valve opening area in the transient state, and this transitional valve opening will be transformed into an opening degree of EGR control valve 21 to control EGR control valve to match the transformed valve opening degree.

Figure 5:
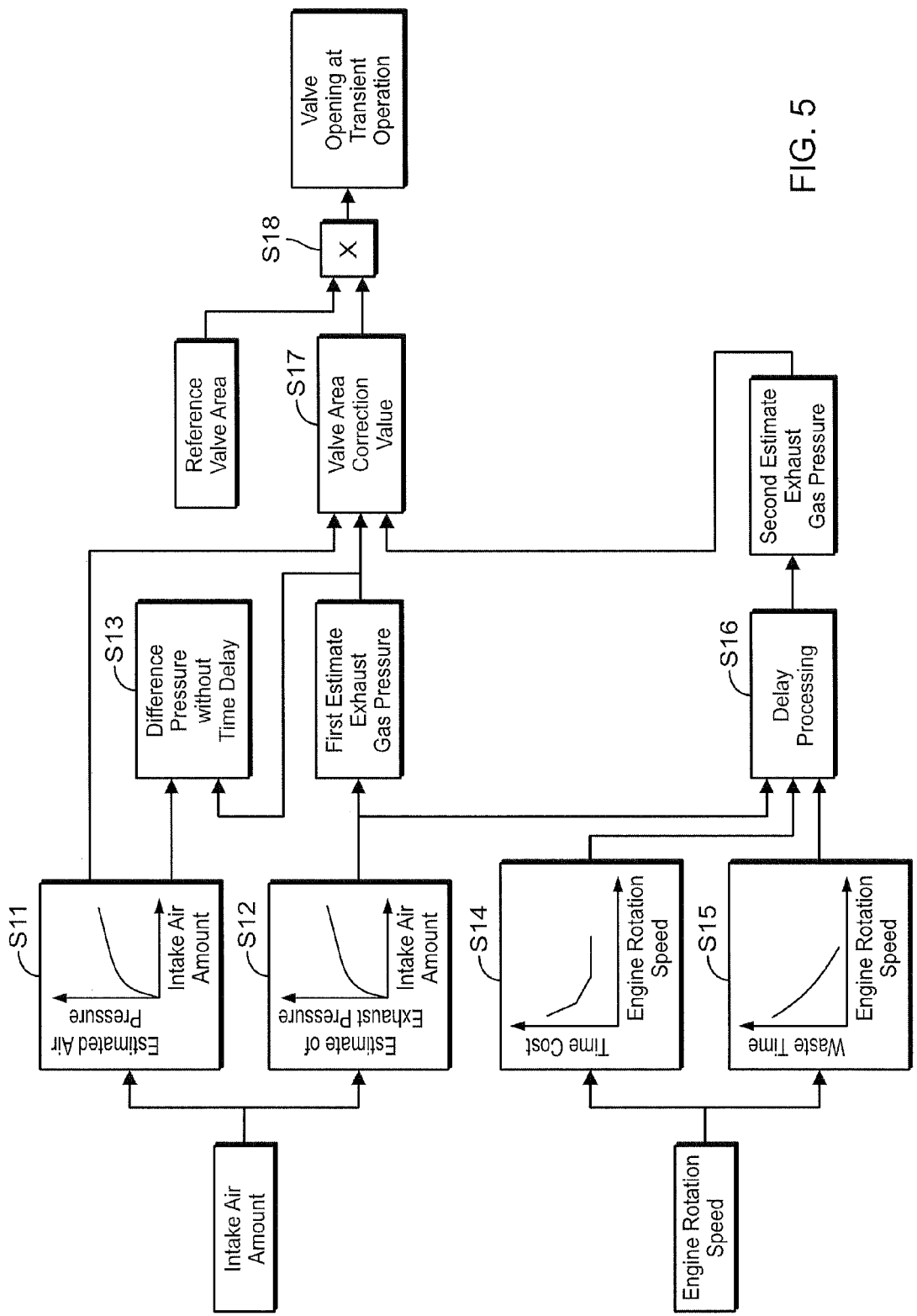
FIG. 5 shows a block diagram of calculation contents to determine EGR valve opening in a transient condition.

FIG. 5 is a block diagram showing the computation contents of the valve opening during a transient. state. In step S11, an estimate of intake air pressure at an EGR injection point is calculated based on an intake air amount detected by airflow meter 6 and by referring to an estimate intake air pressure calculation map. The intake air pressure may be calculated on the assumption that the pressure loss due to intake air system associated components, which are present upstream of this position, such as air cleaner 7 is represented by an orifice of constant diameter. When the intake air increases, the calculated intake air also increases in gauge.

In S12, a first estimate of exhaust gas pressure at a position of EGR extract is obtained based on the detected intake air amount of airflow meter and referring to a first exhaust gas pressure calculation map. The exhaust gas pressure at the position of EGR extract may be calculated by an intake air amount on the presumption that the pressure loss created by an exhaust gas associated component such as an underfloor catalyst (not shown) or muffler (not shown) may be represented by an orifice of constant diameter. The first estimate of exhaust gas pressure does not reflect a delay of first order and/or loss time. As the intake air increases, the calculated value for first estimate of exhaust gas pressure also increases.

In step S13, a difference between the estimated intake air pressure calculated in S11 and the first estimate of exhaust gas pressure calculated in S12 is obtained to determine a pressure difference in a stable state, i.e., neglecting or ignoring the influences due to a first order delay or lag/waste time.

A delay in pressure change in response to change in intake air amount may be considered due to different location of airflow meter 6 and the location in which an actual pressure loss takes place. More specifically, when estimating an exhaust gas pressure based on intake air amount, a gas transportation delay occurs from the position of airflow meter 6 to the above mentioned EGR extract position, the timing at which the exhaust gas pressure changes at the EGR extract position will be delayed accordingly. This response delay is treated in this embodiment as a first-order time constant, loss/waste time.

In S14, based on engine rotation speed and by referring to a time constant calculation map, a time constant for delay in pressure change (a first order delay) may be calculated. As the engine rotation speed increases, the calculated time constant becomes small.

In S15, based on engine rotation speed and using a lag or waste time calculation map, a lag or waste time may be obtained. More specifically, the lag or waste time is associated with a time during which a gas or intake air is enclosed or trapped into and subsequently expelled from a combustion chamber. As the engine rotation speed increases, the calculated lag or waste time will decrease.

In S16, a second estimate of exhaust gas pressure may be calculated based upon the first estimate of exhaust gas pressure and applying the time constant obtained in S14 as well as a waste time obtained in S15 so as to the first-order time delay and waste time are taken into account.

In S17, the estimated intake air pressure and the second estimate of exhaust gas pressure calculated in S16 are used to obtain a difference so that a pressure difference reflecting the first order delay and waste time, i.e., a pressure difference in a transient state, may be obtained. Also, based on the pressure difference in the transient state and the pressure difference neglecting the first order delay and waste time, a difference or rate of these two values are obtained to calculate a valve area correction value.

In a transient state where an intake air amount varies, the EGR rate decreases when the intake air amount increases, while the EGR rate increases in response to intake air amount decreasing. When the intake air amount increases, i.e., when the pressure difference between the estimated air pressure and the second estimate of exhaust gas pressure is small relative to the pressure difference between the estimated intake air pressure and the first estimate of exhaust gas pressure, an EGR rate will be reduced due to a delay in increase in the exhaust gas pressure at the EGR extract position. In contrast, when the intake air amount decreases, i.e., when the pressure difference between the estimated air pressure and the second estimate of exhaust gas pressure is large relative to the pressure difference between the estimated intake air pressure and the first estimate of exhaust gas pressure, an EGR rate will be increased due to a time delay in decrease in the exhaust gas pressure at the EGR extract position.

Therefore, the valve area correction value which is calculated in S17 may be determined to take a larger value to increase an EGR gas amount as the pressure difference which reflects both a first-order delay and waste time becomes smaller as compared to the pressure difference without taking the first-order delay and waste time into account. In contrast, the valve area correction value will be smaller to decrease an EGR gas amount as the pressure difference which reflects both a first-order delay and waste time becomes larger as compared to the pressure difference ignoring the first-order delay and waste time considerations.

In S18, a transient valve area will be determined by applying a transient correction on the above mentioned reference valve area. More specifically, by multiplying the above mentioned reference valve area and the valve area correction value calculated in S17, the transient valve area will be obtained, which will be employed for adjustment of valve area to maintain the EGR rate stable during a transient operation.

Figure 6:
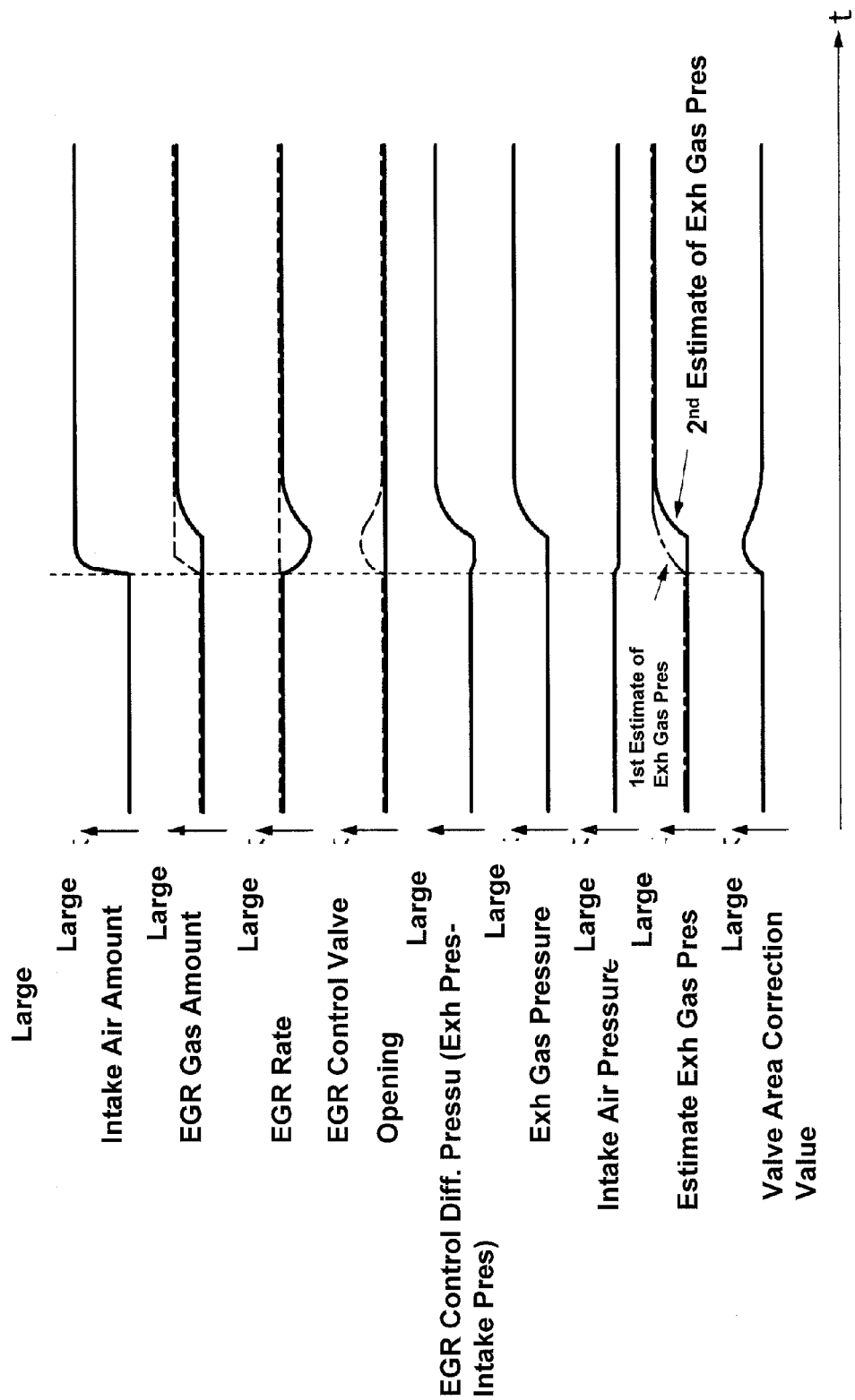
FIG. 6 shows a timing chart of change of various parameters during a transient operation.

FIG. 6 shows a timing chart explaining changes of various parameters over time during a transient operation.

In a transient operation of the engine where an intake amount changes, the exhaust gas pressure will change with a time delay of a timing at which an intake air amount changes. Thus, for example, when an intake air amount increases, the difference pressure between the EGR extract position and EGR injection position increases with a time delay from the change in intake air amount. Thus, as shown in FIG. 6, EGR amount will also be delayed from the change of intake air amount so that the EGR rate will be decreased as shown in bold line in FIG. 6.

To cope with this situation and to maintain the EGR rate substantially constant irrespective of increase of intake air amount, EGR gas amount is required to increase the same change rate as that of intake air amount.

Therefore, in order to obtain a desired EGR gas amount which matches or counterbalances the increased intake air amount, prior to the increase of the difference, pressure between the EGR extract position and EGR injection position, the valve area of EGR control valve 21 will be increased in advance, as indicated in dotted line in FIG. 6.

Assuming that an actual pressure difference between the EGR extract position and injection position will be detected by a pressure sensor or the like, and the opening area of EGR control valve 21 will be subsequently controlled based on the detected pressure difference, then the opening area of EGR control valve 21 may not be manipulated quickly enough. Therefore, in one or more embodiments of the present disclosure, the pressure difference between EGR extract position and EGR injection position will be estimated or predicted, and adjustment on an opening area of EGR control valve 21 will be performed, in advance.

The estimates of exhaust gas pressure at the EGR extract position may be represented either by a first estimate of exhaust gas pressure, as indicated in a dashed line in FIG. 6, which ignores or neglects the first-order delay and waste time, or by a second estimate of exhaust gas pressure, as indicated in a solid line in FIG. 6, which takes both the first-order delay and waste time into consideration. When the exhaust gas pressure at EGR extract position varies in accordance with the first estimate of exhaust gas pressure indicated in dashed line in FIG. 6, EGR rate may be kept constant even at a constant value of valve opening area of EGR control valve 21, since the EGR amount changed in a broken line in FIG. 6. However, in an actual situation, since exhaust gas pressure changes as shown in the second estimate shown in solid line in FIG. 6, lack of exhaust gas pressure will be encountered, which may be represented by a difference from the first estimate of exhaust pressure at the same timing. In order to compensate for this lack in exhaust pressure, valve area correction value will be calculated for adjustments of valve opening of EGR control valve 21 during transient periods.

As explained above, according to one or more embodiments of the present disclosure, valve opening area of EGR control valve 21 is adjusted or corrected based on an estimate of intake air pressure in a position in which EGR passage is connected to intake passage 2 and a second estimate of exhaust gas pressure which is determined by taking a response delay into account in a position in which the EGR passage is connected to exhaust passage (EGR extract position). Therefore, even in a transient state of operation, EGR rate will be controlled with a sufficient accuracy, i.e., kept constant.

Moreover, since the pressures both at the EGR injection position and EGR extract position are estimated based on an intake air amount, the valve opening of EGR control valve 21 may be controlled to maintain a constant EGR rate without relying on use of a sensor to actually detect pressures prior to and after EGR valve 21.

According to one or more embodiments of the present disclosure, an influence of exhaust gas temperature on exhaust gas pressure is considered, and the valve opening area is further corrected depending on the exhaust gas temperature.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

1 Internal combustion engine
2 Intake passage
3 Exhaust passage
5 Throttle valve
6 Airflow meter
9 Exhaust catalyst
10 Turbocharger
11 Compressor
12 Turbine
13 Intercooler
20 EGR passage
21 EGR control valve
22 control unit

What is claimed is:

1. An internal combustion engine having a supercharger, comprising:
an intake air passage delivering intake air into the internal combustion engine;
an exhaust passage discharging exhaust gas from the internal combustion engine;
an exhaust gas recirculation passage connected to the exhaust passage and the intake air passage; and
an exhaust gas recirculation valve interposed within the exhaust gas recirculation passage to control an amount of exhaust recirculation introduced into the intake air passage,
wherein a first end of the exhaust gas recirculation passage is connected to the intake air passage upstream of a compressor of the supercharger,
wherein a second end of the exhaust gas recirculation passage is connected to the exhaust passage downstream of a turbine of the supercharger, and an exhaust gas recirculation control device,
wherein the exhaust gas control device further comprises:
an intake air sensor detecting an amount of the intake air upstream of the compressor;
an intake air pressure estimate unit estimating an intake air pressure at the first end of the exhaust recirculation passage with respect of the amount of the intake air upstream of the compressor being detected;
a first exhaust gas pressure estimating unit estimating a first estimate of exhaust gas pressure at the second end of exhaust gas recirculation passage with respect to the amount of the intake air upstream of the compressor being detected; and
a second exhaust gas pressure estimating unit estimating a second estimate of exhaust gas pressure in combination with a predetermined response-delay processing on the first estimate of exhaust gas pressure, and
wherein the opening of the exhaust gas recirculation valve is adjusted based on a pressure difference between the intake air pressure estimated by the intake air pressure estimate unit and the second estimate of the exhaust gas pressure.

2. The internal combustion engine according to claim 1, wherein the exhaust gas recirculation valve is further adjusted based on a pressure difference between the estimated intake air pressure estimated by the intake air pressure estimate unit and the first estimate of the exhaust gas pressure.

3. The internal combustion engine according to claim 2, wherein, when the pressure difference between the estimated intake air pressure estimated by the intake air pressure estimate unit and the first estimate of the exhaust gas pressure is smaller than the pressure difference between the intake air pressure estimated by the intake air pressure estimate unit and the second estimate of the exhaust gas pressure, the opening of the exhaust gas recirculation valve gas is adjusted to increase an amount of recirculation gas, and
wherein, when the pressure difference between the estimated intake air pressure estimated by the intake air pressure estimate unit and the first estimate of the exhaust gas pressure is larger than the pressure difference between the intake air pressure estimated by the intake air pressure estimate unit and the second estimate of the exhaust gas pressure, the opening of the exhaust gas recirculation valve gas is adjusted to decrease the amount of recirculation gas.

4. The internal combustion engine according to claim 3, wherein the predetermined response-delayed processing is based on a time constant of an engine speed and a lag time.

5. The internal combustion engine according to claim 2, wherein the predetermined response-delayed processing is based on a time constant of an engine speed and a lag time.

6. The internal combustion engine according to claim 1, wherein the predetermined response-delayed processing is based on a time constant of an engine speed and a lag time.

7. The internal combustion engine according to claim 1, further comprising:
a throttle valve disposed in the intake air passage to control an amount of air introduced into the internal combustion engine,
wherein the first end of the exhaust gas recirculation passage is positioned upstream of the throttle valve.

8. The internal combustion engine according to claim 1, further comprising:
a controller that determines a transient operation of the internal combustion engine, and adjusts the opening of the exhaust gas recirculation valve upon determination of the engine transient operation.

9. An internal combustion engine comprising:
an intake passage supplying intake air to the engine;
an exhaust passage discharging exhaust gas out of the engine;
an exhaust gas recirculation gas passage connected to the intake passage and the exhaust passage;
an exhaust gas recirculation control valve adjusting exhaust gas recirculation amount; and
an airflow meter detecting an air flow upstream of the position where the exhaust gas recirculation passage is injected into the intake passage; and
an exhaust gas recirculation control unit configured to:
estimate an intake air pressure in response to the air flow being detected,
estimate a first estimate of exhaust gas pressure based on the air flow being detected at a position in which the exhaust gas recirculation passage is connected for extracting exhaust gas,
estimate a second estimate of exhaust gas pressure in combination with a response-delay due to a change in the air flow on the first estimate of exhaust gas pressure, and
adjust an opening of the exhaust gas recirculation control valve based on the intake air pressure being estimated and the second estimate of exhaust gas pressure.

10. An internal combustion engine having a supercharger, comprising:
an intake air passage delivering intake air into the internal combustion engine;
an exhaust passage discharging exhaust gas from the internal combustion engine;
an exhaust gas recirculation passage connected to the exhaust passage and the intake air passage; and
an exhaust gas recirculation valve interposed within the exhaust gas recirculation passage to control an amount of exhaust recirculation introduced into the intake air passage,
wherein a first end of the exhaust gas recirculation passage is connected to the intake air passage upstream of a compressor of the supercharger,
wherein a second end of the exhaust gas recirculation passage is connected to the exhaust passage downstream of a turbine of the supercharger,
wherein an exhaust gas recirculation device further comprises:
an intake air detecting means for detecting an amount of the intake air upstream of the compressor;
an intake air pressure estimating means for estimating an intake air pressure at the first end of the exhaust recirculation passage with respect to the amount of the intake air upstream of the compressor being detected;
a first exhaust gas pressure estimating means for estimating a first estimate of exhaust gas pressure at the second end of exhaust gas recirculation passage with respect to the amount of the intake air upstream of the compressor being detected; and
a second exhaust gas pressure estimating means for estimating a second estimate of exhaust gas pressure in combination with a predetermined response-delay processing on the first estimate of exhaust gas pressure, and
wherein the opening of the exhaust gas recirculation valve is adjusted based on a pressure difference between the intake air pressure estimated by the intake air pressure estimating means and the second estimate of the exhaust gas pressure.

11. The internal combustion engine according to claim 10, wherein the exhaust gas recirculation valve is further adjusted based on a pressure difference between the estimated intake air pressure estimated by the intake air pressure estimating means and the first estimate of the exhaust gas pressure.

12. The internal combustion engine according to claim 11, wherein, when the pressure difference between the estimated intake air pressure estimated by the intake air pressure estimating means and the first estimate of the exhaust gas pressure is smaller than the pressure difference between the intake air pressure estimated by the intake air pressure estimating means and the second estimate of the exhaust gas pressure, the opening of the exhaust gas recirculation valve gas is adjusted to increase an amount of recirculation gas, and wherein, when the pressure difference between the estimated intake air pressure estimated by the intake air pressure estimating means and the first estimate of the exhaust gas pressure is larger than the pressure difference between the intake air pressure estimated bu the intake air pressure estimating means and the second estimate of the exhaust gas pressure, the opening of the exhaust gas recirculation valve gas is adjusted to decrease the amount of recirculation gas.

13. The internal combustion engine according to claim 12, wherein the predetermined response-delayed processing is based on a time constant of an engine speed and a lag time.

14. The internal combustion engine according to claim 11, wherein the predetermined response-delayed processing is based on a time constant of an engine speed and a lag time.

15. The internal combustion engine according to claim 10, wherein the predetermined response-delayed processing is based on a time constant of an engine speed and a lag time.

16. The internal combustion engine according to claim 10, further comprising:

a throttle valve disposed in the intake air passage to control an amount of air introduced into the internal combustion engine, wherein the first end of the exhaust gas recirculation passage is positioned upstream of the throttle valve.

17. The internal combustion engine according to claim 10, further comprising:

a control means for determining a transient operation of the internal combustion engine, and adjusts the opening of the exhaust gas recirculation valve upon determination of the engine transient operation.

* * * * *

UNITED STATES PATENT AND TRADEMARK OFFICE
CERTIFICATE OF CORRECTION

PATENT NO. : 9,091,223 B2  
APPLICATION NO. : 13/472952  
DATED : July 28, 2015  
INVENTOR(S) : Takeshi Tsuyuki It is certified that error appears in the above-identified patent and that said Letters Patent is hereby corrected as shown below:

In the Claims:

At column 11, claim number 12, line number 21, the word "bu" should read --by--.

Signed and Sealed this
Twenty-second Day of December, 2015

Michelle K. Lee
*Director of the United States Patent and Trademark Office*